(12) United States Patent
Tillotson (10) Patent No.: US 8,036,653 B2
(45) Date of Patent: Oct. 11, 2011

(54) ESTABLISHING AND CONDUCTING COMMUNICATIONS WITHIN A NETWORK

(75) Inventor: Brian J. Tillotson, Kent, WA (US)

(73) Assignee: The Boeing Company, Chicago, IL (US)

( * ) Notice: Subject to any disclaimer, the term of this patent is extended or adjusted under 35 U.S.C. 154(b) by 652 days.

(21) Appl. No.: 11/419,934

(22) Filed: May 23, 2006

(65) Prior Publication Data

US 2007/0273573 A1    Nov. 29, 2007

(51) Int. Cl.
*H04W 4/00*        (2009.01)
(52) U.S. Cl. ........ 455/431; 455/63.4; 370/332; 370/442
(58) Field of Classification Search ................. 370/332, 370/442; 455/431, 63.4
See application file for complete search history.

(56) References Cited

U.S. PATENT DOCUMENTS

| | | | |
|---|---|---|---|
| 5,303,240 A * | 4/1994 | Borras et al. | 370/347 |
| 5,541,929 A | 7/1996 | Jokura | |
| 5,640,395 A | 6/1997 | Hamalainen | |
| 5,767,807 A * | 6/1998 | Pritchett | 342/374 |
| 6,628,707 B2 | 9/2003 | Rafie et al. | |
| 6,788,665 B1 | 9/2004 | Vancraeynest | |
| 6,798,761 B2 | 9/2004 | Cain et al. | |
| 6,804,208 B2 | 10/2004 | Cain et al. | |
| 6,836,242 B1 | 12/2004 | Batzer et al. | |
| 6,859,444 B1 | 2/2005 | Vancraeynest | |
| 6,901,064 B2 | 5/2005 | Cain et al. | |
| 6,904,032 B2 | 6/2005 | Cain | |
| 6,947,733 B2 | 9/2005 | Tillotson | |
| 6,954,449 B2 | 10/2005 | Cain et al. | |
| 6,958,986 B2 | 10/2005 | Cain | |
| 6,982,987 B2 | 1/2006 | Cain | |
| 7,027,109 B2 | 4/2006 | Cain | |
| 7,031,288 B2 | 4/2006 | Ogier | |
| 2003/0064696 A1 * | 4/2003 | Akamine et al. | 455/311 |
| 2003/0179756 A1 * | 9/2003 | Cain | 370/395.42 |
| 2004/0076164 A1 * | 4/2004 | Vanderveen et al. | 370/400 |
| 2004/0152420 A1 * | 8/2004 | Redi et al. | 455/67.11 |
| 2004/0204069 A1 * | 10/2004 | Cui et al. | 455/557 |
| 2004/0242274 A1 * | 12/2004 | Corbett et al. | 455/562.1 |

* cited by examiner

*Primary Examiner* — Nick Corsaro
*Assistant Examiner* — Amanuel Lebassi
(74) *Attorney, Agent, or Firm* — Armstrong Teasdale LLP (57) ABSTRACT

Systems and methods are disclosed for establishing and conducting communications within a network. The discloses systems and methods may include determining a scheduled time period for communications between a first communication node and a second communication node. Furthermore, the disclosed systems and methods may include determining a direction of transmission for transmitting data from the first communication node to the second transmission node and receiving data transmitted from the second transmission node and determining a direction of transmission for receiving data from the first communication node and transmitting data from the second transmission node to the first transmission node. Moreover, the disclosed systems and methods may include establishing communications between the first communication node and the second communication node.

37 Claims, 7 Drawing Sheets

ESTABLISHING AND CONDUCTING COMMUNICATIONS WITHIN A NETWORK

BACKGROUND OF THE INVENTION

This invention relates generally to methods and systems for establishing and conducting communications between nodes in a network. More particularly, the present invention relates to establishing communications between nodes in a network using predetermined time periods for communications between the nodes and directional pointing of the antenna of each node.

Communications between mobile network nodes have been accomplished using directional antennae, which offer the advantages of higher data rate and longer range than omnidirectional antennae. However, directional antennae alone cannot be used for communications between nodes whose locations are unknown to each other. Therefore, in prior art, directional antennae alone cannot be used to establish communication between nodes, because the location of each node is unknown to the other until both nodes join a common network. Using only directional antennae to establish communications is unreliable because a transmitting network node may not be pointing at a receiving network node when the receiving network node is pointing at the transmitting network node. Thus, an omni-directional antenna is also utilized in prior art to establish temporary, low-rate communications to determine where other nodes reside. After a first node obtains the location of at least one other node that belongs to a network the first node wishes to join, the first node can point its directional antenna towards the other node to establish high-rate, long-range communications. However, using the omni-directional antenna to establish the location of other nodes in the network requires additional spectrum space and power to compensate for the operation of the omni-directional antenna. More specifically, the omni-directional antenna requires additional power for operation as it is not focused in a particular direction. Further, the omnidirectional antenna imposes cost and weight on the node beyond the cost and weight of the directional antennae.

Thus, communicating between network nodes using an omni-directional antenna and a directional antenna is costly because two antennae are required for each network node, one antenna (omni-directional) to establish location and another antenna for directional communication. Additionally, the omni-directional antenna utilizes extra spectrum width as well as additional power to transmit data over long distances.

In view of the foregoing, there is a need for more efficient methods and systems for establishing and conducting communications within a network. Furthermore, there is a need for establishing and conducting communications within a network which utilizes a single antenna for establishing location and conducting communications, wherein the antenna utilizes a more narrow spectrum for communications, and utilizes less power in the transmission and reception of data.

BRIEF DESCRIPTION OF THE INVENTION

Consistent with embodiments of the present invention, systems and methods are disclosed for establishing and conducting communications within a network. In accordance with one embodiment, a method for establishing and conducting communications between a plurality of communication nodes is provided which comprises determining a scheduled time period for communications between a first communication node and a second communication node, determining a direction of transmission for transmitting data from the first communication node to the second communication node, determining a direction of reception for receiving data from the first communication node at the second communication node, and establishing communications between the first communication node and the second communication node.

According to other embodiments, the method for establishing and conducting communications between a plurality of communication nodes may include refinements that improve communications. The refinements may include, but are not limited to, adjustments to communications scheduling, adjustments for altitude between a transmitter and receiver, adjustments compensating for differences in longitude between a transmitter and receiver, adjustments due to the curvature of the earth between the transmitter and receiver, and adjustments due to the beam width of a communications medium.

It is to be understood that both the foregoing brief description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and subcombinations of the features described in the detailed description.

BRIEF DESCRIPTION OF THE DRAWINGS

Non-limiting and non-exhaustive embodiments are described with reference to the following Figures, wherein like reference numerals refer to like parts throughout the various views unless otherwise specified.

DETAILED DESCRIPTION OF THE INVENTION

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering, or adding stages to the disclosed methods. Accordingly, the following detailed description does not limit the invention. Instead, the proper scope of the invention is defined by the appended claims.

A communications network implementing the methods and systems for establishing and conducting communications between nodes in a network, as described below, provides communications between parties using an antenna to transmit information and another antenna to receive information. In order to ensure the establishment and maintenance of a communications link between parties, each party directs their antenna using an established pattern which is stored in a table in each communications system. Thus, at a designated time in which communications should occur between two parties, the antenna transmitting information will point toward the receiving antenna for a period of time to facilitate communications and the receiving antenna will point toward the transmitting antenna for a corresponding period of time. Once the respective time period expires, each party moves their antenna in another direction which is also stored in the look up table to establish and/or continue communications with another party.

By pointing the antennae in a designated direction at a certain time, an omni-directional antenna is not required because a direction has already been established for which an antenna is expecting to transmit or receive information. Since omni-directional antennae are not required in the communications network, a communications spectrum for communications between nodes in the network can be reduced. In addition, because omni-directional antennas are not required, power required to establish communications between nodes in the network is also reduced, particularly when the parties are separated by large distances.

Figure 1:
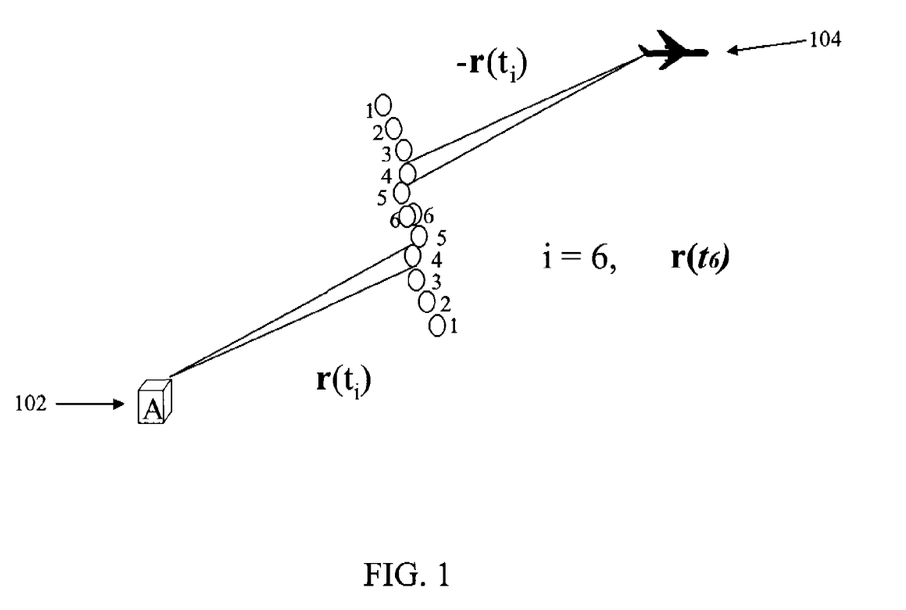
FIG. 1 is a diagram illustrating a time phased antenna pointing method for establishing communications within a network.

FIG. 1 is a diagram illustrating an exemplary method 100 for establishing communications within a network. The method 100 facilitates communications between a new node (Node A 102) and a node already connected to the network (Node B 104) using a directional pointing pattern for phased array antennae as a function of time. The pointing pattern as well as a predetermined schedule for pointing respective antennae and a predetermined communications time length are stored in look-up tables at each of Node A 102 and Node B 104.

The directional pointing pattern, which is subsequently further explained, utilizes a pointing function $r(t_i)$ which uses a unit sphere ($4\pi$ steradians) and time to determine when and in what direction communications should occur between Node A 102 and Node B 104. The time ($t_i$) represents a period of time designated for nodes to establish communications. Thus, when Node A 102 attempts to join the network at (time ($t_6$)), Node A 102 points its antenna at a prescribed direction $r(t_6)$ for time $t_6$ in order to establish communications, while Node B 104 points its antenna at a prescribed direction $r(t_6)$ for time $t_6$. However, because Node B 104 is already connected to the network, the function $r(t_i)$ is negated ($-r(t_6)$) causing Node B 104 to point its antenna in an anti-parallel, that is, a parallel but opposite direction to that of Node A 102 establishing a communications link. Specifically, Node A 102 points toward Node B 104 and Node B 104 points toward Node A 102.

While the function $r(t_i)$ is useful in establishing communications when a time of flight for messages between Node A 102 and Node B 104 is short, and the curvature of the Earth between Node A 102 and Node B 104 is minimal, refinements may be required for long range communications. In order to improve the communication range between Node A 102 and Node B 104, a protocol is implemented, in one embodiment, to provide a common time reference between Node A 102 and Node B 104. The time reference is used to ensure that a message transmitted from Node A 102 arrives at Node B 104 at a time when the antenna of Node B 104 is transmitting in an anti-parallel direction to the antenna of Node A 102.

Accordingly, method 100 may be modified for long range communications by assuming a receiving node (Node B 104) is at either of two possible altitudes: (1) sea level, if Node A 102 is transmitting along a vector which intersects the Earth's surface, or (2) a maximum designated altitude for Node B 104 if Node A 102 is transmitting along a vector which does not intersect the Earth's surface, for example, 100,000 feet. For example, if Node A 102 is at sea level and transmits data to a zenith (a point of the celestial sphere that is directly opposite the nadir and vertically above the observer), the assumed altitude of Node B 104 is, for example, 100,000 feet. Accordingly, if the protocol $r(t_i)$ designates Node A 102 to point toward the zenith at 300 microseconds after each whole second, then Node B 104 points toward the nadir at 300 microseconds after each whole second. However, because Node B 104 is assumed to be at a location 100,000 feet above Node A 102, there is a time delay between data transmission and data reception.

Accordingly, in order for Node B 104 to receive such information at the designated time, i.e. 300 microseconds, Node A 102 should transmit the data prior to the designated time to ensure the data reaches Node B at the designated time. One example equation for determining when Node A 102 should transmit the data could be the following:

$t$=(designated transmission time−(altitude of receiver−altitude of transmitter)/speed of light).

Therefore, using the above example numbers, the time equation is the following:

$t$=300 μsec−((100,000 ft−0 ft)/1000 ft/μsec)=200 μsec

Thus, Node A 102 should transmit information at a time 200 μsec after the beginning of the next whole second in order for the information to be received at Node B 104 at time 300 μsec after the next whole second in order to accommodate for the distance of 100,000 feet.

Figure 2:
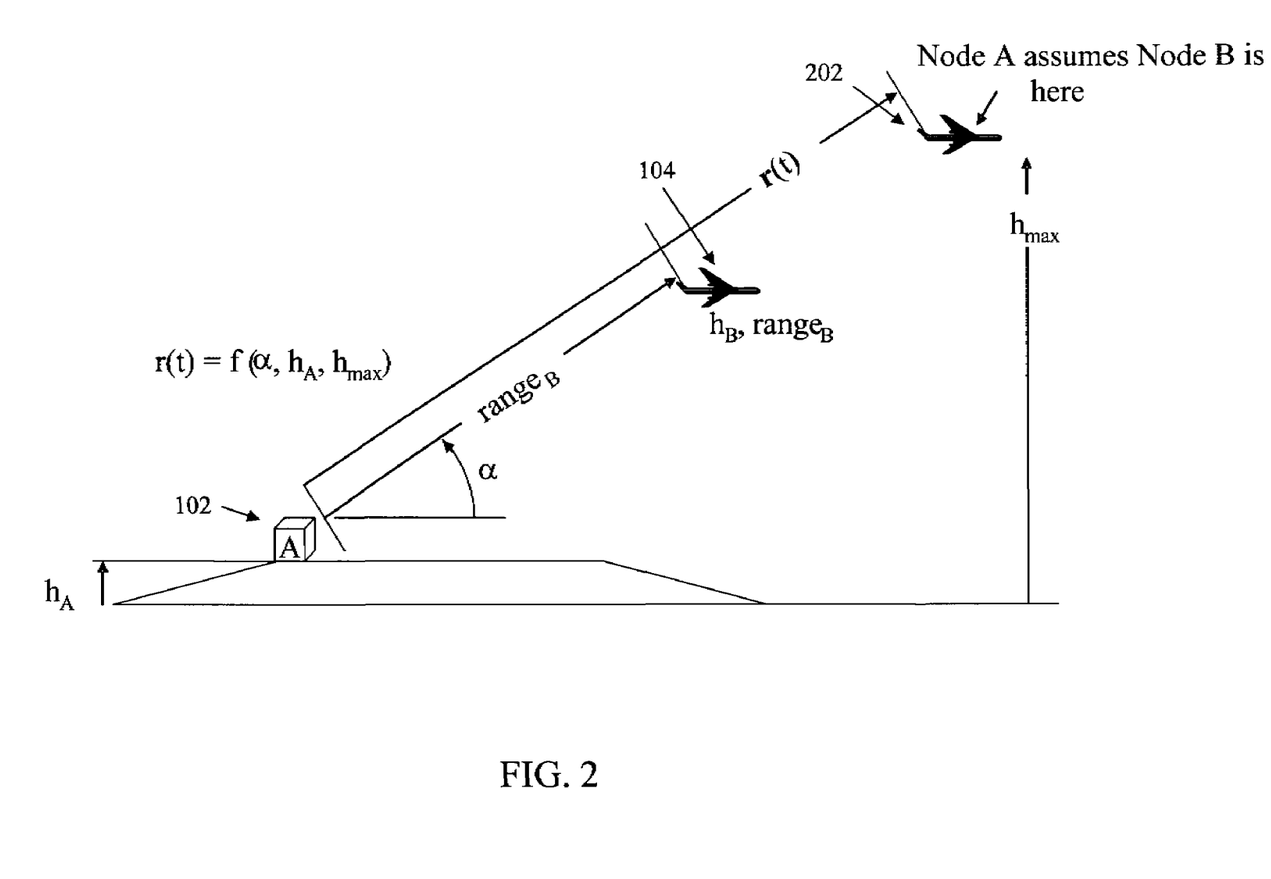
FIG. 2 is a diagram illustrating a refinement of the method of FIG. 1, compensating for a node that is not at an assumed altitude.

However, Node B 104 may not at be located at the assumed altitude of 100,000 feet. FIG. 2 illustrates a method of further refining method 100 to compensate for a node which is not located at an assumed altitude (Node 202). While the time for transmission by Node A 102 if Node B 104 is at an altitude of 100,000 feet is at 200 μsec after the next whole second, Node B 104 may be adjusted to receive information at the designated time even though Node B 104 is at an altitude of 50,000 feet instead of 100,000 feet. By assuming that node B is at a maximum altitude, $h_{max}$, a nominal range to Node B 104 may be computed using the function, $r(t)=f(\alpha, h_a, h_{max})$, with ha being an actual altitude of node B 104 and $\alpha$ being an angle from node A 102 to node B 104. Thus, an equation for adjusting the timing based on a difference of altitude could be the following:

$t$=300 μsec−((100,000 ft−50,000 ft)/1000 ft/μsec)=250 μsec

Thus, Node B 104 adjusts its timing for receiving data to 250 μsec after the next whole second instead of time 300 μsec after the next whole second to compensate for the difference in distance by 50,000 feet.

Figure 3:
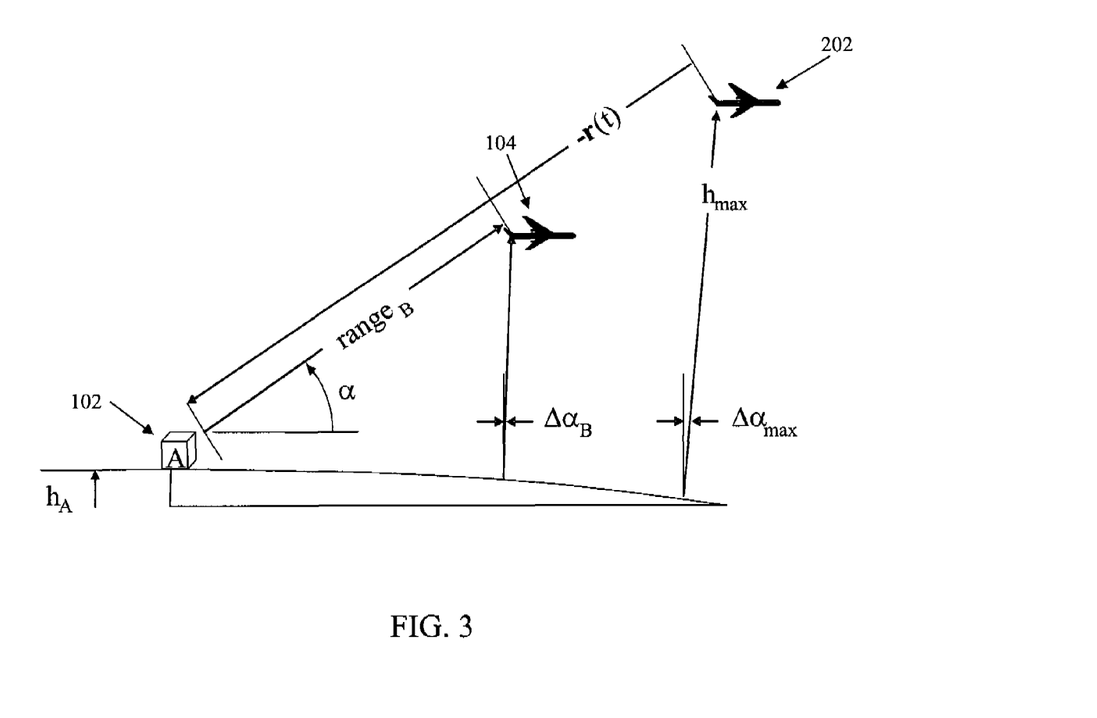
FIG. 3 is a diagram illustrating a refinement of the method of FIG. 1, including a direction offset to compensate for curvature of the earth between two nodes.

In addition to calculating transmission time offsets for transmission and reception of data between Node A 102 and Node B 104, FIG. 3 illustrates a method of further refining method 100 to include a direction offset to compensate for the curvature of the Earth between Node A 102 and Node B 104. The direction offset may be larger when Node A 102 and Node B 104 are separated by a large distance, for example, 500 kilometers.

Thus, when Node A 102 transmits data along a direction $r(t_i)$ at designated time $t_i$ and at an elevation angle ($\alpha$), where $\alpha$ is elevation as a function of $(r(t))-\Delta\alpha$ to compensate for the curvature of the Earth during transmission. Node B 104 could alter its angle of reception to compensate for the curvature of the Earth. In one embodiment, such compensation employs adjusting the reception angle at Node B 104 to the elevation angle $\alpha$, where $\alpha$ is higher in elevation than $-r(t_i)+(\Delta\alpha_{max}-\Delta\alpha_B)$ to ensure Node B 104 remains at $-r(t_i)$, i.e., anti-parallel to that of node A 102.

Figure 4:
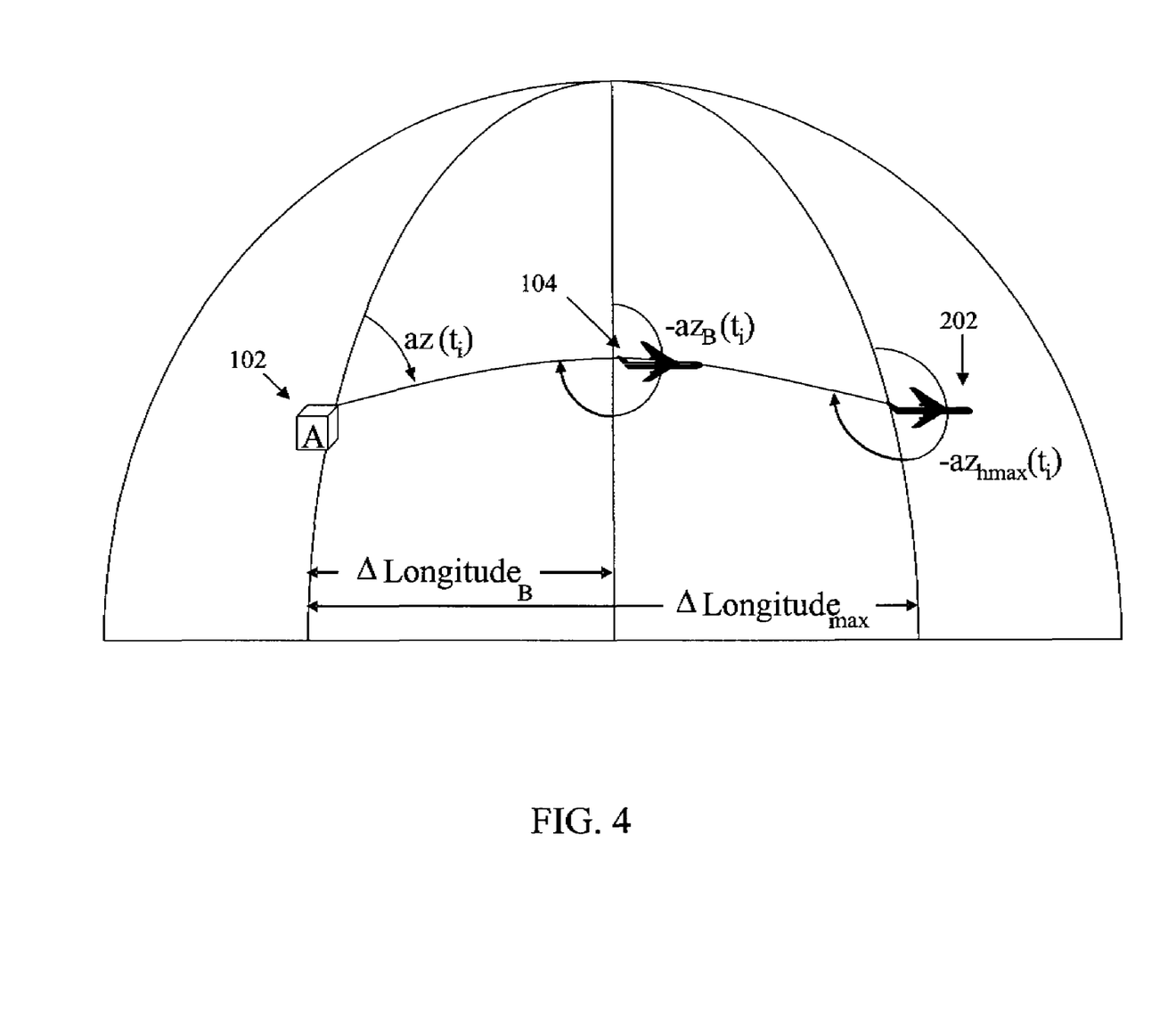
FIG. 4 is a diagram illustrating a refinement of the method of FIG. 1, including compensation for an azimuth angle between nodes at different longitudes.

FIG. 4 illustrates a method of further refining method 100 to compensate for an azimuth angle (horizontal direction expressed as the angular distance between the direction of a fixed point (such as the north pole) and the direction of the object) when Node A 102 and Node B 104 are located at different longitudes. For example, if Node A 102 is located at 90 degrees west longitude and ten miles from the North pole and Node B 104 is at the assumed altitude of 100,000 feet and located at 0 longitude and ten miles from the North pole, at time $t_i$, Node B 104 computes an angle of reception $-r(t_i)$ to be northwest, i.e. an azimuth of 315 degrees. Node A 102 computes a transmission angle $r(t_i)$ to be northeast, i.e. an azimuth of 45 degrees; however, due to being located at different longitudes, when Node A 102 transmits data at an azimuth of 45 degrees, Node B 104 will receive the data accordingly at an azimuth angle of 315 degrees due to the 90 degree difference in longitude.

Accordingly, during a transmission for an instance in which Node A 102 and Node B 104 are located at different longitudes, Node A 102 transmits data assuming that Node B is at the designated altitude of 100,000 feet and an azimuth angle $az(t_i)$, where $az(t_i)=f(-az_{hmax}(t_i), h_A, h_{max})$. However, if Node B 104 is not located at the designated altitude, Node B 104 adjusts the angle of reception to $-az_B(t_i)$. Node B 104 projects from its location along $R(t)$ to the designated altitude, then computes the change in longitude along that path. The changes in longitude become the angle adjustment.

Figure 5:
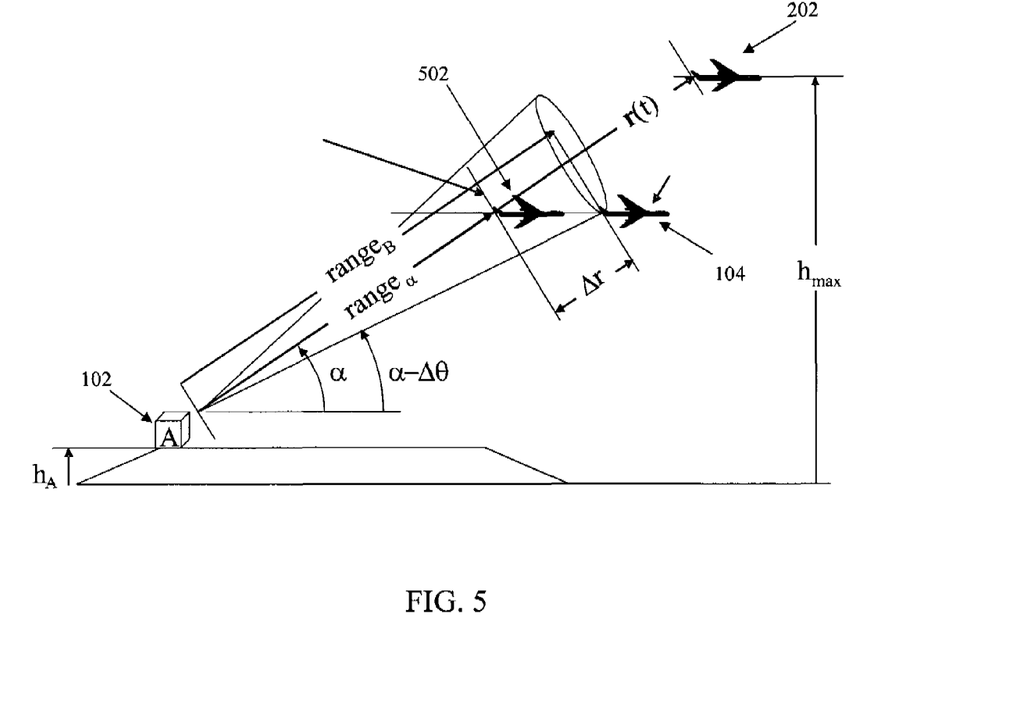
FIG. 5 is a diagram illustrating a refinement of the method of FIG. 1, including compensation for data transmissions where the beam width is not zero.

While the above illustrated method and refinements provide for communications between Node A 102 and Node B 104 using a communications medium having an ideal beam width of zero, communications using antennae having beam widths which are not equal to zero may require additional adjustments to facilitate communications between Node A 102 and Node B 104. FIG. 5 illustrates a method of further refining method 100 to compensate for data transmissions using a communications medium having a beam width which does not equal zero.

In a transmission in which the transmission beam width does not equal zero, a degree of uncertainty is introduced because the transmission signal travels in the form of a cone instead of along a line, similar to a laser beam. Thus, the transmission signal forms an ellipse at a point of intersection between the transmission beam and the altitude plane of Node B 104. Accordingly, adjustments made by Node B 104 to receive the transmission signal may not allow for the reception of data from Node A 102 correctly because Node B 104 cannot precisely calculate the distance between itself and Node A 102 (range uncertainty). For example, Node B may reside at location 104 instead of 502. Range uncertainty may be equated to the term, $\Delta r=range_\alpha * f(\alpha, \Delta\Theta, h_B)$.

Factors contributing to range uncertainty include transmission beam width, elevation angle for the transmission beam, and the difference in altitude between Node A 102 and Node B 104. Range uncertainty is related to the temporal dispersion of data being transmitted because as the communication beam width increases or the elevation angle for the transmission beam is small, i.e., transmissions near the horizon, range uncertainty and temporal dispersion increases. Temporal uncertainty may be equated to the term $\Delta t=\Delta r/c$.

Thus, an adjustment can be employed at Node A 102 to minimize timing errors which could occur due to the imprecision in calculating the location of Node B 104. In addition, because angular errors due to the imprecision of locating Node B 104 are normally less than the beam width used for transmissions, these errors may be deemed insignificant when correcting for a non-zero beam width. The angular error may be as large as half the beam width. If the angular error is larger, then Node B 104 is within the beam of a different pointing direction, $r(t_j)$. The adjustment at Node A 102 may include transmitting multiple messages within a short duration, for example, several messages having a duration of 1.2 microseconds may be transmitted to Node B 104 during a designated communication period, for example, 150 microseconds. Another adjustment includes transmitting a message at the beginning of a designated and at the end of the designated time period. Yet another adjustment includes utilizing a minimum spread of repeated messages in the direction $r(t_i)$ to ensure that Node B 104 receives at least one message during the time period $t_i$.

Figure 6:
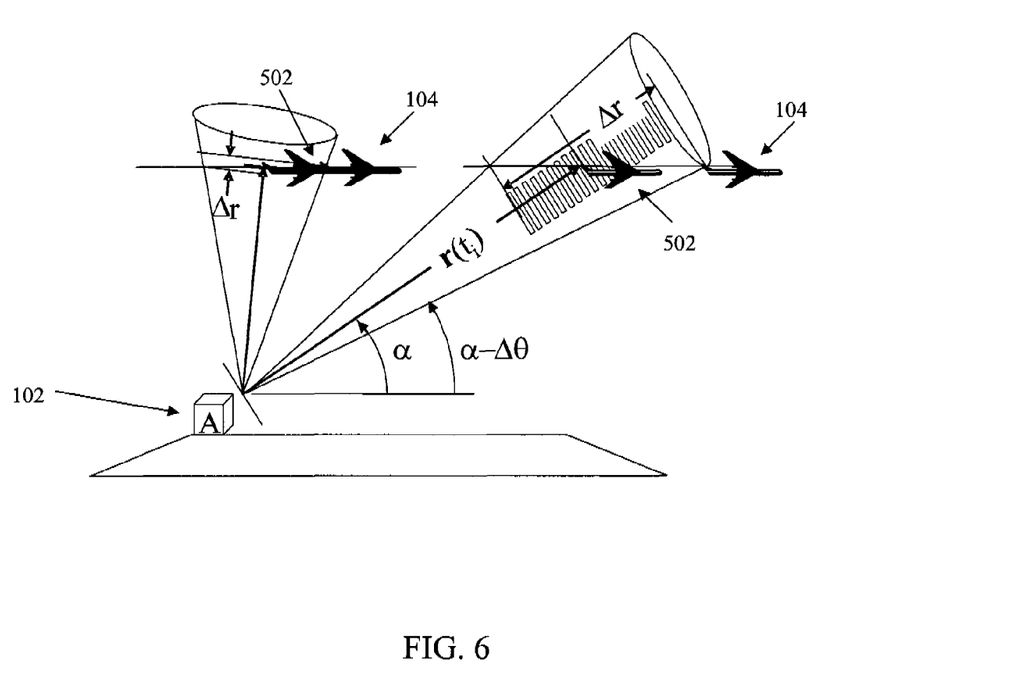
FIG. 6 is a diagram illustrating communications between nodes where there is a variable beam width.

While Node A 102 normally uses an antenna having a fixed beam width, Node A 102 could also use an antenna which has a variable beam width as illustrated in FIG. 6. By using a transmitter and antenna that provide a variable beam width, Node A 102 could transmit data to Node B 104 using a wide beam width when such transmissions are near-vertical. In near vertical cases, the range from Node A 102 to node B 104 is less than the maximum node altitude, so a narrow beam is not necessary to achieve adequate gain. More specifically, range uncertainty when using wide beams for transmissions during near-vertical communications between Node A 102 and Node B 104 is not significant due to the high angle of elevation. As further described with respect to FIG. 7, a large fraction of a unit sphere near a zenith can be covered with a wider beam with one or a couple of messages. As the beam is transmitted in a substantially vertical direction, it is not likely to be intercepted, for example, by an enemy or other unintended recipient.

Figure 7:
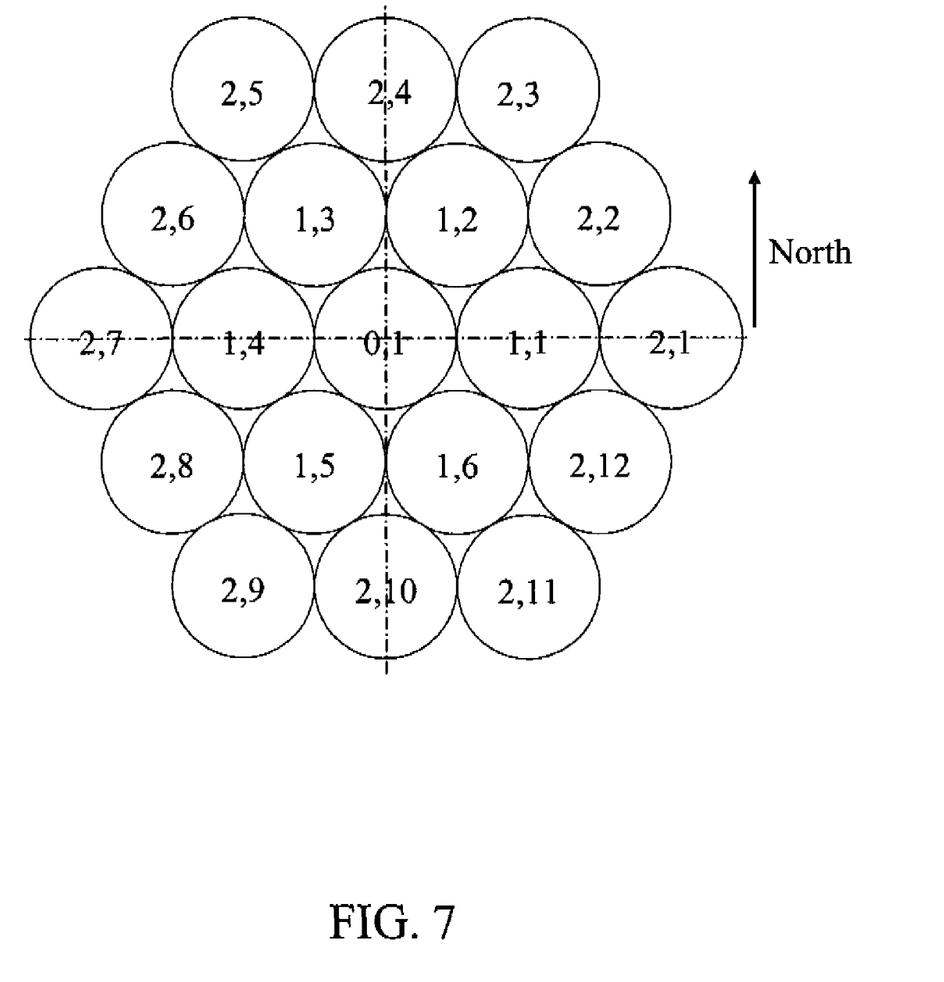
FIG. 7 is an illustration of an antenna pointing pattern.

FIG. 7 illustrates a method of determining where antennae should point at a given time period (pointing pattern). Such information is, in one example embodiment, stored in the look-up table at each node. When a node, for example, Node A 102 desires to establish communications with another node in a network, i.e., join the network, the antenna at Node A 102 may access the pointing pattern from the look-up table to determine which direction to point the antenna during a given time period.

The pointing pattern may be based on a unit sphere and may follow a honeycomb pattern. A direction for the first pointing direction may point towards the nadir, i.e. direction (0,1), subsequently moving outward in a sphere forming a ring around the nadir. The movement may be repeated while the direction moves further away from the nadir. However, when using the curved surface of the unit sphere, the diameter of circular beams may be reduced as the pointing pattern moves further away from the nadir to remain within the surface of the unit sphere.

The pointing pattern is determined, in one embodiment, using the following table and formulas:

| Ring | N | R (rads) | Residue | Outer R (rads) | Outer R (deg) |
|---|---|---|---|---|---|
| 0 | 1 | 0.1020 | 0 | 0.102 | 5.84 |
| 1 | 6 | 0.1104 | −6.15E−09 | 0.323 | 18.49 |
| 2 | 12 | 0.1097 | −4.02E−08 | 0.542 | 31.07 |

-continued

| Ring | N | R (rads) | Residue | Outer R (rads) | Outer R (deg) |
|---|---|---|---|---|---|
| 3 | 18 | 0.1053 | −9E−08 | 0.753 | 43.13 |
| 4 | 24 | 0.0984 | −1.16E−07 | 0.950 | 54.41 |
| 5 | 30 | 0.0903 | −1.02E−07 | 1.130 | 64.76 |
| 6 | 36 | 0.0817 | −6.24E−08 | 1.294 | 74.12 |
| 7 | 42 | 0.0733 | −2.5E−08 | 1.440 | 82.52 |
| 8 | 48 | 0.0653 | −4.82E−09 | 1.571 | 90.00 |

The formula in "Ring" is the prior row's value+the formula in "N", or (Ring×6). "N" is the number of beams in this ring, and "R" is the angular radius of beams in the ring. "Residue" is calculated as (2×N)×R−(2π×sin(("Outer R of prior row"+R)/1)), "Outer R (rads)" is calculated as "Outer R of prior row"+2×R, and "Outer R (deg)" is calculated as "Outer R (rads)"×180/π. R, in one embodiment, is optimized using an Excel solver.

Accordingly, the approach used in devising this pattern may be as follows: After ring 0, each succeeding ring has a number of beams equal to six times the index of the ring. A communications systems manufacturer may select the number of rings to use thereby allowing system software to iterate the sizes of beams in each ring in order to get a total angle of 90 degrees (pole to equator) across all the rings. The constraints for the solver may be that all values in the "Residue" column are zero (within a specified precision.)

An exemplary table of the pointing pattern of FIG. 7 for storage in the look-up table could be the following:

| Ring | N | R (rads) | Outer R (rads) | Outer R (deg) |
|---|---|---|---|---|
| 0 | 1 | 0.1020 | 0.102 | 5.84 |
| 1 | 6 | 0.1104 | 0.323 | 18.49 |
| 2 | 12 | 0.1097 | 0.542 | 31.07 |
| 3 | 18 | 0.1053 | 0.753 | 43.13 |
| 4 | 24 | 0.0984 | 0.950 | 54.41 |
| 5 | 30 | 0.0903 | 1.130 | 64.76 |
| 6 | 36 | 0.0817 | 1.294 | 74.12 |
| 7 | 42 | 0.0733 | 1.440 | 82.52 |
| 8 | 48 | 0.0653 | 1.571 | 90.00 |

Accordingly, the pointing pattern could sweep out in a pattern going from equator to zenith. Another pointing pattern could employ a pattern going from the equator to zenith and from the equator to the nadir at the same time. Each of the two beams could receive data in opposite directions during each time slot Such a pattern could cover the unit sphere in half the time, leaving more time for network activity unrelated to establishing communications with the network. The starting point for the pointing pattern above is arbitrary and may utilize another starting point or sequence of pointing.

A system for implementing the methods and refinements described above may include an electronically steerable antenna for communications, an altimeter to determine altitude, an attitude measuring device to determine orientation, a time measuring device, for example, an atomic clock, and a computing device and database for determining a pointing direction for a prescribed time period which may be stored in the look-up table.

Thus, the systems and methods for establishing and conducting communications within a network allow for communications to be established by nodes joining a network using the same antenna used during normal communications thereby reducing spectrum and power requirements, as well as the cost of additional equipment (omni-directional antenna). Antennae which can be employed may include a phased array antenna or some other type of steerable antenna. Other devices to determine altitude which may be utilized include a global positioning device (GPS) or radar altimeter. In addition, communications may be established using the above systems and methods between non-terrestrial nodes, i.e., two or more satellites. The use of the terms receiver or transmitter are not meant to be exhaustive and may include other communication devices such as transceivers and optical communication devices.

The systems and methods described above may be used in a variety of applications, for example, military communication applications. Such an application is beneficial because the systems and methods described above reduce the possibility of signal detection and signal interception because each antenna points toward a specific location for a predetermined period of time using a narrow, directional beam. Thus, the locations or plans of friendly forces are harder to be compromised by the enemy.

The invention may be practiced in an electrical circuit comprising discrete electronic elements, packaged or integrated electronic chips containing logic gates, a circuit utilizing a microprocessor, or on a single chip containing electronic elements or microprocessors. The invention may also be practiced using other technologies capable of performing logical operations such as, for example, AND, OR, and NOT, including but not limited to mechanical, optical, fluidic, and quantum technologies. In addition, the invention may be practiced within a general purpose computer or in any other circuits or systems.

The present invention may be embodied as systems, methods, and/or computer program products. Accordingly, the present invention may be embodied in hardware and/or in software (including firmware, resident software, micro-code, etc.). Furthermore, embodiments of the present invention may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium, upon which the program is printed, as the program can be electronically captured, via, for instance, optical scanning of the paper or other medium, then compiled, interpreted, or otherwise processed in a suitable manner, if necessary, and then stored in a computer memory.

Embodiments of the present invention are described above with reference to block diagrams and/or operational illustrations of methods, systems, and computer program products according to embodiments of the invention. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved.

While certain features and embodiments of the invention have been described, other embodiments of the invention may exist. Furthermore, although embodiments of the present invention have been described as being associated with data stored in memory and other storage mediums, aspects can also be stored on or read from other types of computer-readable media, such as secondary storage devices, like hard disks, floppy disks, or a CD-ROM, a carrier wave from the Internet, or other forms of RAM or ROM. Further, the steps of the disclosed methods may be modified in any manner, including by reordering stages and/or inserting or deleting stages, without departing from the principles of the invention.

While the invention has been described in terms of various specific embodiments, those skilled in the art will recognize that the invention can be practiced with modification within the spirit and scope of the claims.

What is claimed is:

1. A communications node comprising:
   a processing device;
   a time measuring device communicatively coupled to said processing device;
   a steerable antenna, pointing of said steerable antenna controlled by said processing device, said processing device programmed with prescheduled time periods for establishing communication between said communications node and a second communications node, said processing device further programmed to direct an orientation of said steerable antenna during each scheduled time period to define a direction of transmission and reception for said steerable antenna for each scheduled time period.

2. A communications node according to claim 1 wherein said steerable antenna comprises an electronically steered phased array antenna.

3. A communications node according to claim 1 wherein to program said processing device with scheduled time periods and directions of transmission and reception, said communications node comprises a database that comprises data correlating time periods to directions of transmission and reception.

4. A communications node according to claim 1 further comprising an altitude measuring device, said altitude measuring device communicatively coupled to said processing device.

5. A communications node according to claim 1 further comprising an attitude measuring device configured to determine an orientation of said communications node, said attitude measuring device communicatively coupled to said processing device.

6. A communications node according to claim 1 wherein said steerable antenna comprises a variable beam width.

7. A communications system comprising at least two communications nodes, each said communications node comprising a processing device, a steerable antenna, and sharing a common time reference, each said node of said communication system programmed with:
   a scheduled time period for establishing communication between a first said communication node and a second said communication node using only the steerable antenna of each said node;
   a directional pointing function for orienting said steerable antenna during each scheduled time period thereby defining a direction of transmission and a direction of reception for said steerable antennas, the directions associated with the scheduled time period for communications.

8. A communications system according to claim 7 wherein pointing of said steerable antennas are controlled by said processing devices within each communications node.

9. A communications system according to claim 7 wherein during the scheduled time period for communications, the direction of transmission for the first said communication node and the direction of reception for the second said communication node are anti-parallel.

10. A communications system according to claim 9 wherein the first said communication node and the second said communication node are at different altitudes.

11. A communications system according to claim 7 wherein said communications nodes are programmed to determine the time of transmission and time of reception for a scheduled time period using a time offset for communications between the first said communications node and the second said communications node.

12. A communications system according to claim 7 wherein to determine a direction of transmission for a first said communications node, the first said communications node is programmed with an assumed altitude for a second said communication node.

13. A communications system according to claim 7 wherein to determine a direction of transmission for a first said communications node, the first said communications node is programmed with an angle offset for communications with the second said communications node.

14. A communications system according to claim 13 wherein the angle offset compensates for the curvature of the Earth between the location of the first said communications node and the location of the said second communications node.

15. A communications system according to claim 7 wherein to determine a direction of transmission for a first said communications node, the first said communications node is programmed with an azimuth angle offset for communications with the second said communications node.

16. A communications system according to claim 7 wherein determinations of the direction of transmission and the direction of reception between two said communications nodes are based on a predetermined pattern for the respective angle of transmission and angle of reception, the predetermined pattern associated with a function of time.

17. A communications system according to claim 7 wherein said steerable antenna of at least one of said communications nodes comprises a variable angular beam width.

18. A communications system according to claim 17 wherein said processing device is programmed to widen the angular beam width of said steerable antenna for substantially vertical transmissions of said communications node that originate from a substantial zenith.

19. A communications system according to claim 7 wherein the second node of said communications system is programmed to negate the orientation of the steerable antenna associated with the second network node as defined by the directional pointing function such that the antenna of the first network node is pointed in a parallel, but opposite direction than the antenna of the second network node for at least one scheduled time period.

20. A communications system according to claim 7 wherein said communications nodes comprise a common time reference, such that the parallel, but opposite, antenna direction is maintained for subsequent antenna orientations of the nodes, the common time reference ensuring, regardless of a distance between the network nodes, that a message transmitted will be received while the antenna associated with the reception is oriented in the anti-parallel direction that corresponds to the orientation of the antenna of the transmitting node when the message was transmitted.

21. A method for establishing communications between a network node and a second node, each node including an antenna, one node operating as a receiving node, the other as a transmitting node, said method comprising:

executing, according to a predetermined schedule, at both nodes, a directional pointing function, the directional pointing function for orienting the antennas of the nodes for a time period;

negating the orientation of the antenna associated with the network node as defined by the directional pointing function such that the antenna of the network node is pointed in a parallel, but opposite direction than the antenna of the second node;

setting a common time reference for the nodes; and using the common time reference to ensure, regardless of a distance between the network node and the second node, that a message transmitted will be received at a time when the antenna associated with the reception is oriented in the anti-parallel direction to the orientation of the antenna of the transmitting node when the message was transmitted for a plurality of antenna orientations.

22. The method of claim 21 further comprising utilizing an assumed altitude for determining a time of transmission from the transmitting node will be received at the receiving node.

23. The method of claim 22, wherein to determine a time of reception at the receiving node, said determination is adjusted if the receiving node does not reside at the assumed altitude.

24. The method of claim 21, wherein executing the directional pointing function comprises:

orienting the antenna for transmission from the transmitting node; and determining of the direction of reception for the receiving node using a direction offset for communications between the transmitting node and the receiving node.

25. The method of claim 24, wherein the direction offset compensates for the curvature of the Earth between the location of the transmitting node and the location of the receiving node.

26. The method of claim 21 further comprising using an azimuth angle offset for communications between the transmitting node and the receiving node.

27. The method of claim 26, wherein the azimuth angle offset compensates for differences in longitude between the transmitting node and the receiving node.

28. The method of claim 21, wherein the transmitting node and the receiving node utilize a communications medium having a predetermined angular width.

29. The method of claim 28, wherein the predetermined angular width of the communications medium is zero.

30. The method of claim 28, wherein the direction of transmission for the transmitting node and the direction of reception for the receiving node compensates for the communications medium when the predetermined angular width of the communications medium does not equal zero.

31. The method of claim 30, wherein the transmitting node transmits data to the receiving node using multiple joining messages within a predetermined joining slot.

32. The method of claim 21, wherein at least one of the transmitting node and the receiving node utilize a communications medium having a variable angular beam width.

33. The method of claim 32 further comprising widening the angular beam width of a communication medium for substantially vertical transmissions originating from a zenith.

34. The method of claim 21, wherein the determining of the direction of reception for the receiving node and the direction of transmission for the transmitting follow a predetermined pattern defined by the directional pointing function.

35. The method of claim 34, wherein the predetermined pattern is associated with a function of time.

36. The method of claim 34, wherein a look-up table is utilized to store the predetermined pattern used to coordinate communications between the transmitting node and the receiving node.

37. The method of claim 21, wherein at least one of the transmitting node and the receiving node is associated with an aircraft.

* * * * *